Feb. 25, 1930.  C. HELLE  1,748,551
ELECTRIC PIPE WELDING APPARATUS
Filed March 27, 1929
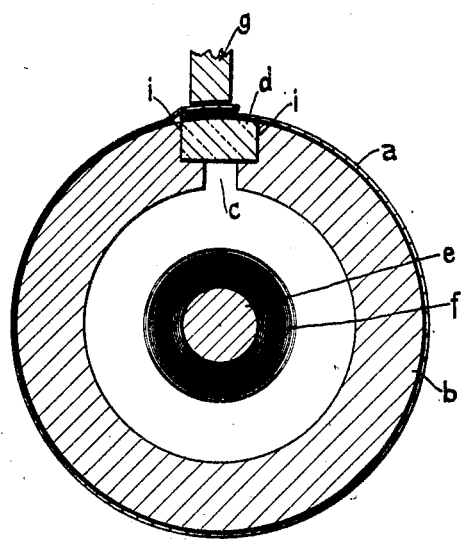
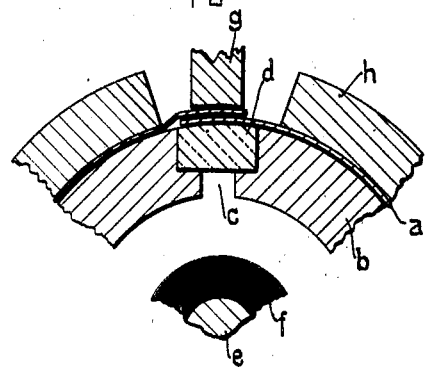
Inventor:
Carl Helle,
by P.W. Dahw,
Attorney.

Patented Feb. 25, 1930

1,748,551

UNITED STATES PATENT OFFICE

CARL HELLE, OF BRUNSWICK, GERMANY

ELECTRIC PIPE-WELDING APPARATUS

Application filed March 27, 1929, Serial No. 350,306, and in Germany June 11, 1927.

My invention relates to improvements in electric pipe welding apparatus, and more particularly in apparatus of the type in which the electric energy is transformed by means of a transformer having its secondary in the form of an open ring adapted to be placed in contact with the pipe to be welded, the open part of the ring being bridged by the seam to be welded. The object of the improvements is to provide an apparatus of this class in which the parts to be welded are adapted to be pressed into close contact with each other while welding, so that the resistance opposed to the current passing through the seam is uniform, and a uniform joint is produced. With this object in view my invention consists in placing the said open ring within the pipe to be welded with the seam bridging the open part thereof, and providing a support or an anvil of non-conductive material in the open part of the ring and below the seam to be welded, the said anvil being adapted to press the parts of the seam together.

For the purpose of explaining the invention an example embodying the same has been shown in the accompanying drawing, in which Fig. 1, is a sectional elevation showing the welding apparatus and a pipe placed thereon, and Fig. 2, is a partial sectional elevation showing a modification.

In the example shown in the drawing the welding apparatus comprises a mandrel $b$ in the form of an open annular thick metal plate having a rod $d$ of non-conductive material such as glass or quartz placed in recesses $i$ of the ends of the plate $b$, the said rod $d$ bridging the gap $c$ of the plate $b$. Within the mandrel $b$ there is a primary coil $f$ enclosing an armature $e$, the said primary coil being connected with a source of electric energy. On the mandrel the pipe $a$ to be welded is placed, the overlapping ends of the said pipe being located on the rod $d$. When passing an alternating current through the primary coil, a current is induced in the plate $b$. The resistance opposed to the said current within the plate $b$ is very small, and it is high at the seam of the pipe $a$, so that the heat necessary for welding is produced in the seam. While welding the overlapping ends of the pipe are pressed together by means of a rod $g$ of non-conductive material placed thereon and pressing the said ends on the rod $d$. Thereby a uniform current is produced in the seam, which is necessary for uniform welding.

In the modification shown in Fig. 2 an outer open ring $h$ is placed on the pipe $a$, the said ring pressing the blank $a$ on the plate $b$ and thus insuring a good contact between the pipe $a$ and the plate $b$ and further increasing the cross-sectional area of the parts in contact with the pipe outside the seam thereof, so that practically heat is produced only between the overlapping ends of the blank.

My improved welding apparatus is particularly suitable for welding pipes having thin walls, because in such cases it is important that the overlapping ends of the pipe be pressed together.

I claim:

1. An apparatus for welding pipes, comprising an open ring of conductive material adapted to have the pipe placed thereon with the seam bridging the gap of the ring, a member of non-conductive material placed in the gap of the ring for providing a support for the seam to be welded, and a primary coil in inductive relation to said ring to form a transformer.

2. An apparatus for welding pipes, comprising an open ring of conductive material adapted to have the pipe placed thereon with the seam bridging the gap of the ring, a member of non-conductive material placed in the gap of the ring for providing a support for the seam to be welded, and a primary coil within said ring in inductive relation to said ring to form a transformer.

3. An apparatus for welding pipes, comprising an open ring of conductive material adapted to have the pipe placed thereon with the seam bridging the gap of the ring, a member of non-conductive material placed in the gap of the ring for providing a support for the seam to be welded, a primary coil in inductive relation to said ring to form a transformer, and means for pressing the seam of the pipe on said member of non-conductive material.

4. An apparatus for welding pipes, comprising an open ring of conductive material adapted to have the pipe placed thereon with the seam bridging the gap of the ring, a member of non-conductive material placed in the gap of the ring for providing a support for the seam to be welded, a primary coil in inductive relation to said ring to form a transformer, and an open ring of conductive material adapted to be placed around the pipe being welded and to press the seam on the inner ring.

In testimony whereof I affix my signature.

CARL HELLE.